United States Patent

[11] 3,626,203

[72] Inventor Peter G. Bartlett
Davenport, Iowa
[21] Appl. No. 45,384
[22] Filed June 11, 1970
[45] Patented Dec. 7, 1971
[73] Assignee Struthers-Dunn, Inc.
Pitman, N.J.

[54] MECHANICAL SWITCH INTERFACE
3 Claims, 4 Drawing Figs.

[52] U.S. Cl. .......... 307/208, 307/247, 307/257, 307/269, 328/87, 328/208
[51] Int. Cl. .......... H03k 19/12
[50] Field of Search .......... 307/203, 208, 247, 257, 269; 328/208, 86, 87

[56] References Cited

UNITED STATES PATENTS

| | | | |
|---|---|---|---|
| 3,188,484 | 6/1965 | Jorgensen | 307/257 X |
| 3,277,949 | 10/1966 | Walbridge | 307/257 X |
| 3,124,705 | 3/1964 | Gray, Jr. | 307/257 X |
| 2,903,605 | 9/1959 | Barney et al. | 307/247 X |

*Primary Examiner*—Donald D. Forrer
*Assistant Examiner*—R. C. Woodbridge
*Attorneys*—William D. Hall, Elliott I. Pollock, Fred C. Philpitt, George Vande Sande, Charles F. Steininger and Robert R. Priddy ABSTRACT: An interface is provided to allow signals from a relatively low-speed mechanical or electromechanical system to be used in a high-speed electronic system. Each of the input signals is fed to a rectifying circuit and then the signal is transmitted to a gated flip-flop. The output of the gated flip-flop is coupled with an inhibiting signal and applied to an output inverter. The output is a high-speed, small rise-time signal usable in electronic computing or control systems.

PATENTED DEC 7 1971 3,626,203
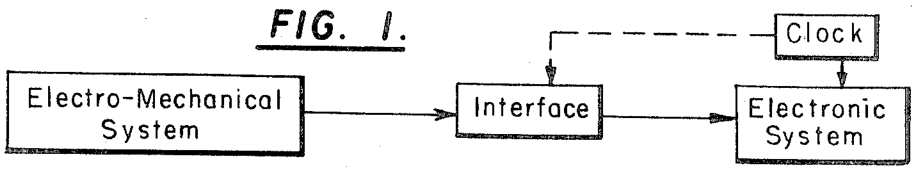
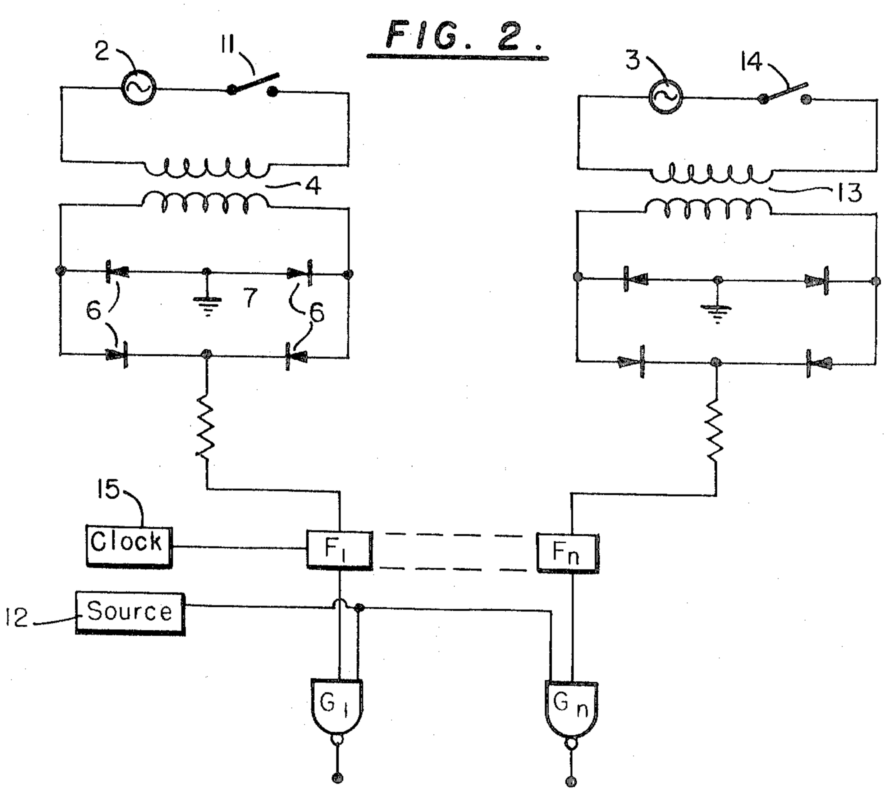
FIG. 4.
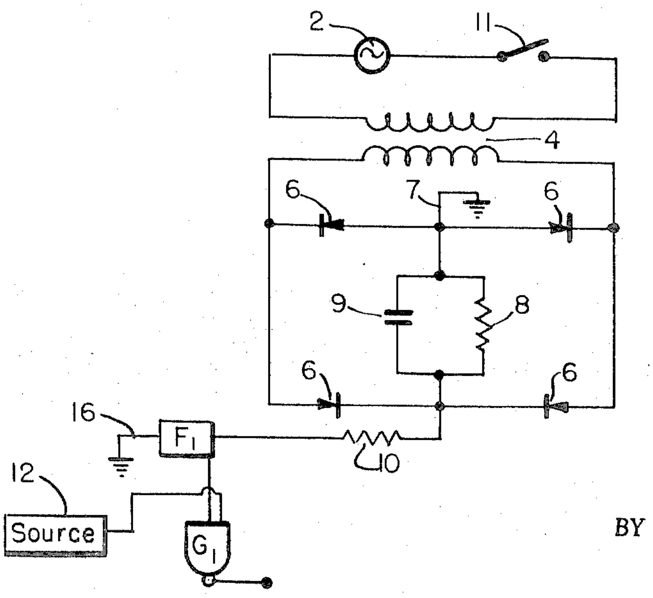
INVENTOR
Peter G. Bartlett
BY Hall, Pollock & Vande Sande
ATTORNEY INVENTOR
Peter G. Bartlett BY Hall, Pollock & Vande Sande
ATTORNEY

MECHANICAL SWITCH INTERFACE

BACKGROUND OF THE INVENTION

The present invention relates to an interface. More particularly, it relates to an interface which is designed to allow electrical signals developed in a mechanical or electromechanical system to be useful in high-speed electronic computer or control circuitry. The art has been aware, for some time, that electrical signals generated in mechanical or electromechanical systems are, without further modification, generally not usable in high-speed electronic circuitry. The present invention is directed at a circuit which will accept the electrical signals referred to above and generate high-speed signals which are capable of direct use in electronic circuitry.

Electrical signals generated in mechanical or electromechanical systems, such as systems employing manual switches, electrical relay switching systems and other systems in which a signal is generated when a mechanical element either opens or closes an electrical circuit, have characteristics which make them unusable in high-speed electronic circuitry. These undesirable characteristics can all be traced to the fact that, due to their mechanical nature, the exact time of opening or closure of a circuit cannot be precisely defined. For that reason, the pulselike signals which are produced do not have the steep rise-time or rapid switch-off which is characteristically required in high-speed electronic circuitry. Thus, one reason for the existence of interface circuits is to modify signals produced in electromechanical systems for use in high-speed electronic systems.

Another reason for the use of interface circuits is that the electromechanical system will usually be operating at a different voltage level than that which is used in the electronic circuitry. Generally, the electromechanical system is associated with an AC power circuit in which the voltage magnitude is of the order of 100 volts or more. Commonly, the electronic high-speed circuitry is composed of transistors which operate as switching devices. That is, the signals are reflected in the circuit as either conducting or nonconducting states of the various transistors. These circuits generally do not use AC power, nor are they required to withstand the voltage levels usually found in the electromechanical systems. From this background it is also clear that the interface circuit is required to translate AC electrical signals of substantial magnitude into DC signals which will not damage the transistor circuitry.

In addition, noise levels in the electromechanical system, acceptable there due to the slow response of the devices normally connected thereto, are intolerable in the electronic system due to the high speed of response in that system. Therefore, the interface must also guard against passing the noise signals of the electromechanical system into the electronic system where it could cause false indications.

Also, characteristically, the electronic circuitry is designed and operates on an orderly timed basis. That is, the circuit is designed to respond to signals which occur at precisely spaced intervals of time. Since the electromechanical system is responding to phenomena which are uncontrollable so far as the timing of the high-speed circuitry is concerned, the interface must also act as a buffer. That is, it will allow the indications produced by the electromechanical system to affect the high-speed electronic circuitry only during the times when the high-speed circuitry is capable of responding correctly to these signals.

SUMMARY OF THE INVENTION

Therefore, it is one object of the present invention to provide an interface system for modifying electrical signals produced in electromechanical systems for use in high-speed electronic circuitry. It is another object of the present invention to provide such an interface which is capable of producing signals characteristic of high-speed electronic circuitry from the ill-defined signals produced in the electromechanical system. It is another object of the present invention to provide an interface for producing signals properly timed for use in electronic high-speed circuitry from the random signals generated by the electromechanical systems. It is another object of the present invention to provide an interface which will be capable of interconnecting the low-voltage DC circuitry of the high-speed circuits with the high-voltage AC circuitry found in electromechanical systems. It is a further object of the present invention to provide an interface which will minimize the possibility of false indications due to transients or other spurious signals in the electromechanical system or in the interface itself.

BRIEF DESCRIPTION OF DRAWINGS

FIG. 1 is a block diagram showing a system in which the present invention could be used.

FIG. 2 is a schematic diagram of the preferred embodiment of the present invention.

FIG. 4 is a schematic diagram of another embodiment of the present invention.

DETAILED DESCRIPTION OF DRAWINGS

Figure 3:
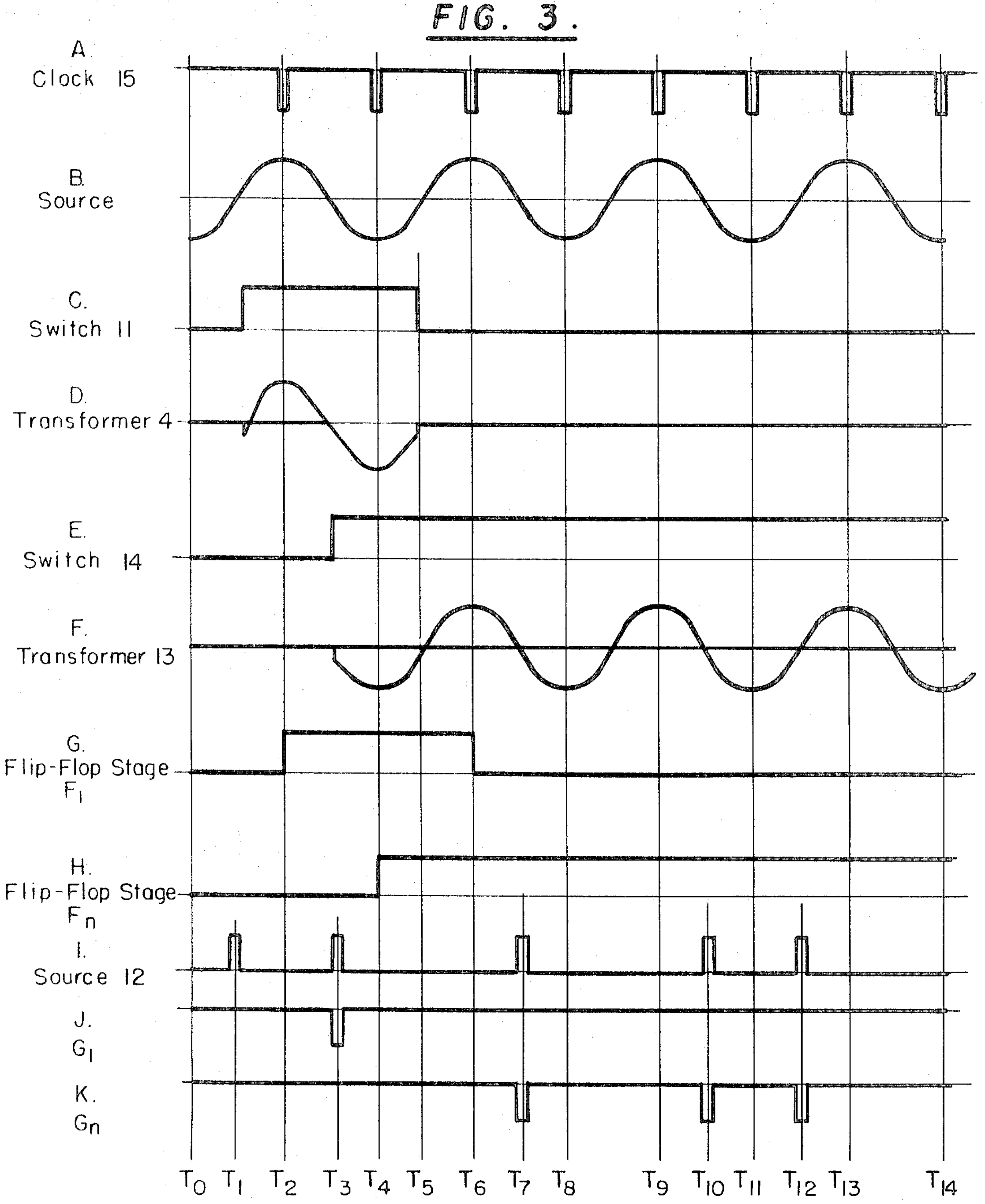
FIG. 3 shows system waveforms as an aid in explaining the operation of the system.

FIG. 1 shows, in block diagram form, how the interface is associated with both the electromechanical system and the high-speed electronic circuitry. The interface accepts signals generated in the electromechanical system, which signals for reasons explained above are not suitable for use directly in the high-speed electronic circuitry. The interface may also accept input signals from the clock source. In one embodiment clock signals are required and in another they are not required. For this reason the clock input to the interface is shown dotted in FIG. 1. With the information generated by the electromechanical system and the timing information received from the clock source, if required, the interface generates suitable signals for use in the high-speed electronic circuitry. The signals generated by the interface will have the characteristic needed to operate the high-speed circuitry. These signals will have short rise-times and fall-times and will be so timed as to appear when the high-speed circuitry is capable of accepting them and acting properly with them.

FIG. 2 is a schematic showing of the interface of the present invention. The interface is composed of a plurality of stages, one for each of the switches which form the inputs. FIG. 2 shows two such stages, it being understood that any number of stages can be accommodated. The input to each stage is in the form of a switch, the input to the first stage being switch 11 which is intended to represent, for instance, a mechanical switch, a relay contact, a photocell, magnetic sensing coil, or any other electrical circuit making and breaking means which perform its function by the physical movement of a mechanical element. Included in the circuit with switch 11 is a power source 2. This will generally be a 60 Hz. source and although one is shown for each of the stages, it is apparent that the power source could be common to all stages. Also in series with switch 11 is the primary of a transformer 4.

The secondary of transformer 4 is connected across a bridge circuit including diodes 6. This constitutes a full-wave rectifier for the AC power which is induced in secondary of the transformer 4. One side of the measurement branch of the bridge is grounded at 7. The output of the bridge is connected through resistor 10 to the input of one stage, $F_1$, of a multistage flip-flop. Each succeeding stage of the flip-flop is fed by another stage of the interface. The multistage flip-flop also receives a clocking signal from clock 15. The clock 15 comprises a high-frequency oscillator and pulse formers designed to produce the particular type clocking signal required by the multistage flip-flop.

The output of each stage of the flip-flop is fed to a respective one of the inverting gates, $G_1$–$G_N$. Each of these gates is also fed a pulse signal from source 12. Source 12 also comprises an oscillator and pulse formers; however, source 12 is controlled by the electronic circuitry to gate signals from the interface when the circuitry is capable of accepting them. Finally, each of the outputs of gates $G_1$–$G_n$ forms the input for the electronic circuitry.

Operation

The operation of the interface of the present invention will now be described with the aid of FIG. 3 which shows typical waveforms produced in the system during its operation. In FIG. 2 the position of any of the switches 11 to 14 is indicated by the presence or absence of a voltage on the transformer secondary associated with that switch. The AC voltage induced is rectified by the diode bridge and fed by a resistor 10 to the corresponding flip-flop stage. An active input to a flip-flop indicates the associated switch is closed and, conversely, an inactive flip-flop input indicates an open switch.

Each stage of the multistage flip-flop $F_1$–$F_n$ is supplied with an enabling input from clock source 15, and each stage is so arranged that it can operate to its "zero" or "one" state in response to the opening or closure of the respective contact only at the time that such stage is receiving an input pulse from clock source 15. As shown in FIG. 3, the clocking signals appear at times $T_2$, $T_4$, $T_6$, $T_8$, $T_9$, $T_{11}$, $T_{13}$, and $T_{14}$. The reason for the timing of the clocking signals in relation to the source will become apparent as the description proceeds.

Assume now that at time $T_1$, switch 11 is closed while switch 14 remains open (see FIG. 3, lines C and E). Therefore, the transformer secondary 4 will be energized at this time (FIG. 3, line D) while the transformer 13 secondary associated with switch 14 will not be energized (FIG. 3, line F). The bridge circuit formed by diodes 6 will then rectify the signals supplied by the secondary of transformer 4. The rectified signal is now passed by a resistor 10 to the input of the corresponding flip-flop stage $F_1$. Inasmuch as the multistage flip-flop at time $T_1$ is not receiving an input from clock source 14, the signal from resistor 10 will have no effect. However, at time $T_2$ a clocking input from clock source 15 is fed to the multistage flip-flop and at this time flip-flop stage $F_1$ is receiving an input via resistor 10. It will change state as shown on line G in FIG. 3. When the clock signal disappears, subsequent to time $T_2$ the flip-flop will remain in its "on" state inasmuch as no signal has yet appeared to change its state. Similarly, when switch 14 is closed, at $T_3$, a signal is generated in the secondary of transformer 13 which has the form shown in FIG. 3 at line F. This too, will have no effect on multistage flip-flop $F_n$ until such time as a clocking signal appears at time $T_4$.

In our example, switch 11 is subsequently opened at time $T_5$. This will remove the input signal on the primary of transformer 4 (see line D) and, will also re move the input signal to flip-flop stage $F_1$. As explained above, however, the output of flip-flop stage $F_1$ will not change. At time $T_6$, the time of the next clock signal, the absence of an input to flip-flop stage $F_1$ will result in switching the state of that flip-flop so that now the output will go to ground as shown in FIG. 3 at line G.

Switch 14 is closed at time $T_3$. Therefore, primary winding of transformer 13 will at this time be energized as will the input to flip-flop stage $F_n$. Due to the nature of the flip-flop, no output will be produced until the next subsequent clock signal at time $T_4$. At this time, as shown in FIG. 3, line H, flip-flop stage $F_n$ changes state and produces an output signal indicative of the closure of switch 14.

The clocking signal 15 is chosen to occur simultaneously with the power source reaching a maximum absolute value of magnitude as shown in FIG. 3. This choice eliminates a possible ambiguity in the input to each flip-flop stage for the following reason. The closure of a switch can only be sensed at the flip-flop by the presence of a voltage above some minimum predetermined level. Thus, if the switch closure occurred at a time when the source voltage was in the vicinity of ground, the flip-flop would receive a zero or near zero voltage from the respective full-wave rectifier and this condition is indistinguishable from the condition wherein the associated contact is open. However, since the flip-flop only responds to inputs at the time of each clock pulse and since each clock pulse occurs when the source voltage is at its peak amplitude, the situation has been remedied.

The timing of the clock signal in relation to the source voltage also minimizes the possibility of a false indication due to spurious signals. A false indication is possible if a transient occurs during the time of switch closure and is equal in magnitude, and opposite in polarity, to the signal fed to the flip-flop from the associated rectifier. By generating the clock signal at a time when the input to the flip-flop is at a maximum, the effect of spurious transients is greatly minimized. This is so since the only transient which can be effective at this time is one which is equal in magnitude to the source voltage itself, and such transients, as can be readily understood, are rare. False indications may also occur when a transient is large enough to exceed the threshold level of a flip-flop. The use of the clock also minimizes these in the following manner. Since the clocked flip-flop is relatively insensitive to negative transients, as discussed above, the threshold level of the flip-flop may be raised over that required if the flip-flop were not clocked. This minimizes the number of transients which can cause a false switch closure indication since the positive transient must be greater than the higher threshold.

The effective transients can further be reduced by making the clocking signal short in duration. For example, the clocking signal may be as short as 1 microsecond, in which case only transients occurring at that precise time will have any effect on the system.

The output of each of the stages of the flip-flop is fed individually into a plurality of NAND gates $G_1$ to $G_n$. A signal from source 12 is also fed to each of these gates. Source 12 comprises an oscillator and pulse formers. This is controlled by the electronic circuitry to gate output signals from gates $G_1$ through $G_n$ only at times when the electronic circuitry is capable of accepting indications. For purposes of illustration, FIG. 3 shows at line I signals from source 12, occurring at times $T_1$, $T_3$, $T_7$, $T_{10}$, and $T_{12}$. As a consequence, the NAND gate $G_1$ will produce a signal at time $T_3$ indicative of the closure of switch 11. At times $T_1$, $T_{10}$, and $I_{12}$, the output from NAND gate $G_1$ will be high because of the absence of an input to the gate $G_1$ from the flip-flop stage $F_1$, indicating that the switch 11 at these times is open. Similarly, the output of NAND gate $G_n$ will indicate that switch 14 is closed at times $T_7$, $T_{10}$, and $T_{12}$ as shown in FIG. 3 on line K.

The above description relates to the operation of the embodiment of the invention shown in FIG. 2. FIG. 4 shows another embodiment of the invention which differs from the embodiment shown in FIG. 2 in two respects. For one thing, a parallel combination of resistor 8 and capacitor 9 has been added across the bridge circuit in series with the input to each stage of the multistage flip-flop. The second change is that the clocking source input to the flip-flop has been deleted and this terminal has been grounded at 16. The grounding of this input to the multistage flip-flop allows the output of each stage of the flip-flop to follow the input continuously. That is, as the voltage on the input rises above a predetermined threshold the flip-flop will change state and its output will go high and conversely as the input to the flip-flop decreases to a predetermined lower level, it will again change state and cause its output to go low.

The circuit of FIG. 4 operates in the same manner as the circuit of FIG. 2 with one distinction. When a corresponding switch 11 is closed the signal induced in the secondary of transformer 4 will be a full-wave rectified sine wave. Twice in every cycle of operation, the voltage induced in the secondary of transformer 4, when the switch 11 is closed, will approach zero. Inasmuch as the flip-flop stage $F_1$ is continuously following the input signal, absent some protection, the output of this flip-flop would follow the voltage signal on the secondary of transformer 4 as rectified by the rectifier. This would result in flip-flop stage $F_1$ producing a succession of high and low outputs which bears no relation to the position of switch 11. To remedy this situation, the parallel combination of resistor 8 and capacitor 9 is provided. The filtering action of these elements will be sufficient to maintain the input to flip-flop stage $F_1$ high enough so that the flip-flop will not change state with the rising and falling voltage induced in the transformer secondary 4. In this manner, the output of the flip-flop stage $F_1$ will then correspond to the position of switch 11 in that the output of stage flip-flop $F_1$ will be low only when the corresponding switch 11 is open.

It should be noted that the waveforms of FIG. 3 are provided merely for purposes of illustration and particularly the pulse widths have not been drawn to scale. For instance, the period of the source signals and signals on switches 11 and 14 may be of the duration of 16 milliseconds corresponding to a 60 Hz. frequency. On the other hand, the pulse signal such as that produced by clock 15 and source 12 may be quite readily made as short as 1 microsecond. The repetition rate of the clock signals is related to the frequency of the power source and so the repetition rate would be 120 pulses per second. The pulse signals from source 12 occur at a repetition rate which is governed by the electronic circuitry, and, as a matter of fact, there is no necessity that the pulse signals from source 12 be produced at any particular repetition rate. The interface circuit is designed to operate to produce an output whenever the signal from source 12 enables the same and in fact the pulse signals from source 12 may be random.

The interface circuit of the present invention therefore provides indications of electromechanical switch position such as the position of switches 11 to 14 in the form of pulses, such as those shown on lines J and K in FIG. 3, timed in accordance with the circuitry to which the pulses are to be applied and which pulses have the characteristics required to operate high-speed electronic circuitry. The system provides protection against false indication caused by spurious signals, such as transients, by interrogating the flip-flop condition at predetermined times by the clock signal. In the second-described embodiment the interface provides signals to gates $G_1$ through $G_n$ which at all times indicates the position of switches 11 to 14. In the latter mode of operation, however, a time delay is introduced to preclude the output signals from following the rectified sine wave which would result in false indications. Of course, one may provide clock inputs to terminal 16 in FIG. 4, in which case the interface would operate as FIG. 2 with the slight delay introduced by the filtering action of resistor 8 and capacitor 9.

Although two specific embodiments of the invention have been disclosed, it will be apparent to those skilled in the art that various changes and modifications can be made without departing from the spirit or scope of the invention. For instance, the signal inputs to the system can be generated by photocells or magnetic sensing coils in addition to the mechanical type switches disclosed. Also, with appropriate modification to the clock signal input, the full-wave rectification can be replaced by half-wave rectification. As a further example of changes which could be made without departing from the spirit or scope of the invention, the inverters shown as the output could obviously be replaced by AND gates, with appropriate modification of the input signals from source 12.

I claim:

1. An interface circuit for coupling at least one circuit element associated with a power frequency source and producing a randomly-occurring input to a digital computer comprising,
   - means responsive to said randomly-occurring input for generating a direct-current signal throughout the presence of said randomly-occurring input,
   - a flip-flop circuit to which said direct-current signal is applied as a first input,
   - a clock-pulse source generating a single clock pulse coincidentally with each attainment of maximum amplitude by the voltage of the power frequency source,
   - means coupling said clock-pulse source to said flip-flop a a second input,
   - said flip-flop being operated from its first state to its second state only in response to the concurrent application thereto of said first and second inputs and being operated back to its first state only in response to the occurrence of one said clock pulse in the absence of said first input,
   - and means responsive to the condition of said flip-flop.

2. The combination of claim 1 in which said responsive means includes a NAND gate, one input of said NAND gate being coupled to the output of said flip-flop, a second source of clock pulses, a second input of said NAND gate being connected to said second clock-pulse source.

3. The combination of claim 1 in which said direct-current signal comprises a full-wave rectified alternating-current signal.

* * * * *